United States Patent
Rakowski et al.

(10) Patent No.: US 11,609,475 B2
(45) Date of Patent: Mar. 21, 2023

(54) OPTICAL RING MODULATOR WITH PHOTONIC CRYSTAL

(71) Applicant: GLOBALFOUNDRIES U.S. INC., Santa Clara, CA (US)

(72) Inventors: Michal Rakowski, Ballston Lake, NY (US); Yusheng Bian, Ballston Lake, NY (US); Won Suk Lee, Malta, NY (US); Roderick A. Augur, Saratoga Springs, NY (US)

(73) Assignee: GLOBALFOUNDRIES U.S. Inc., Santa Clara, CA (US)

( * ) Notice: Subject to any disclaimer, the term of this patent is extended or adjusted under 35 U.S.C. 154(b) by 46 days.

(21) Appl. No.: 17/119,042

(22) Filed: Dec. 11, 2020

(65) Prior Publication Data

US 2022/0187676 A1 Jun. 16, 2022

(51) Int. Cl.
*G02F 1/225* (2006.01)

(52) U.S. Cl.
CPC ........ *G02F 1/2257* (2013.01); *G02F 2202/32* (2013.01); *G02F 2203/15* (2013.01)

(58) Field of Classification Search
CPC . G02F 1/2257; G02F 2202/32; G02F 2203/15
USPC ........................................................ 385/1–3
See application file for complete search history.

(56) References Cited

U.S. PATENT DOCUMENTS

| | | | |
|---|---|---|---|
| 10,185,205 B2 * | 1/2019 | Popovic | G02F 1/0118 |
| 10,627,697 B2 * | 4/2020 | Hendrickson | G02B 6/1225 |
| 10,852,570 B1 * | 12/2020 | Tu | G02F 1/2257 |
| 2006/0008223 A1 * | 1/2006 | Gunn, III | G02F 1/025 385/129 |
| 2012/0301069 A1 * | 11/2012 | Goldring | G01N 21/7746 385/2 |
| 2015/0212346 A1 * | 7/2015 | Zheng | G02F 1/025 398/186 |
| 2017/0038609 A1 * | 2/2017 | Luo | G02F 1/2255 |
| 2020/0124883 A1 * | 4/2020 | Delisle-Simard | G02F 1/025 |

FOREIGN PATENT DOCUMENTS

WO    WO 2019/190119 A1 *  3/2019   ............. G02B 6/293

OTHER PUBLICATIONS

"High-bandwidth photonic-crystal-based ring resonator pin modulator" by Nikoufard et al, Optik, vol. 136, pp. 172-180 (Year: 2017).*

(Continued)

*Primary Examiner* — Robert Tavlykaev
(74) *Attorney, Agent, or Firm* — Hoffman Warnick LLC (57) ABSTRACT

Embodiments of the disclosure provide an optical ring modulator. The optical ring modulator includes waveguide with a first semiconductor material of a first doping type, and a second semiconductor material having a second doping type adjacent the first semiconductor material. A P-N junction is between the first semiconductor material and the second semiconductor material. A plurality of photonic crystal layers, each embedded within the first semiconductor material or the second semiconductor material, has an upper surface that is substantially coplanar with an upper surface of the waveguide structure.

11 Claims, 11 Drawing Sheets

(56) References Cited

OTHER PUBLICATIONS

"Low power and fast electro-optic silicon modulator with lateral p-i-n embedded photonic crystal nanocavity" by Tanabe et al, Optics Express, vol. 17, No. 25, pp. 22505-22513 (Year: 2009).*
"Air-mode photonic crystal ring resonator on silicon-on-insulator" by Gao et al, Scientific Reports, 6:19999; pp. 1-6 (Year: 2016).*
"Air and dielectric bands photonic crystal microringresonator for refractive index sensing" by Urbonas et al, Optics Letters, vol. 41, No. 15, pp. 3655-3658 (Year: 2016).*
Baba et al., "Slow-light Mach-Zehnder modulators based on Si photonic crystals," Sci. Technol. Adv. Mater. 15 (2014), 11 pages.
Govdeli et al., "Integrated Optical Modulator Based on Transition between Photonic Bands," Scientific Reports (2018), 11 pages.
Integlia et al., "Longitudinal and Angular Dispersions in Photonic Crystals: A Synergistic Perspective on Slow Light and Superprism Effects," J. Nanosci. Nanotechnol. 2010, vol. 10, No. 3., 10 pages.

* cited by examiner

OPTICAL RING MODULATOR WITH PHOTONIC CRYSTAL

TECHNICAL FIELD

Embodiments of the disclosure relate generally to structures for propagation and processing of optical signals. More specifically, the disclosure relates to an optical ring modulator with photonic crystals embedded therein.

BACKGROUND

The rise of networking devices, such as the "Internet of Things" (IoT), with links to a data center has accompanied a larger number of signal-processing elements in integrated circuits (ICs). ICs may be modified, adapted, etc., to house the various components needed to transmit light from one component to another. Various ICs formed to include photonic devices and microcircuitry are known as "photonic integrated circuits" (PICs). PIC dies typically include optical components on the surface or at the edge of a PIC die to transmit light into and from the optical devices therein such as waveguides and grating couplers. The various optical components, e.g., photonic waveguides, photonic transmitters and receivers, etc., can relay signals through light transmission.

The propagation of information in a photonic domain from one component to another often requires the use of an optical modulator, such as ring modulator. A ring modulator is an optical ring resonator for tuning resonance wavelengths in an optical signal. An optical resonator refers to a component formed of an optical waveguide formed in a circular shape, and placed in close proximity to another waveguide (bus). When the light is passaging through a bus waveguide, some small percentage of optical power is coupled to the ring waveguide structure via a coupling mechanism. The coupled power can be regulated by distance between the bus waveguide and the ring itself. Optical power can build up in the ring to such a level that even small percentages of light transmitted back to the bus waveguide can destructively interfere with the light passing propagating on the bus waveguide.

Optical modulators may be formed within a PIC die by embedding a P-N junction in a bus waveguide, to change effective index of the material through which a light is propagating. Hence, the optical modulator changes the effective optical length and the wavelength at which resonance occurs. The resonance wavelength shifts according to a bias voltage applied to the P-N junction, thereby defining the efficiency of the modulator. A higher wavelength resonance shift results in a higher extinction ratio (ER) and lower insertion loss (IL).

SUMMARY

Aspects of the present disclosure provide an optical ring modulator, including: a waveguide structure, including: a waveguide structure, including: a first semiconductor material having a first doping type, and a second semiconductor material adjacent the first semiconductor material and having a second doping type opposite the first doping type, defining a P-N junction within the waveguide structure; and a plurality of photonic crystal layers, each photonic crystal layer embedded within the first semiconductor material or the second semiconductor material of the waveguide structure, and having an upper surface that is substantially coplanar with an upper surface of the waveguide structure.

Further aspects of the present disclosure provide an optical ring modulator, including: a waveguide structure, including: a waveguide structure, including: a first semiconductor material having a first doping type, and a second semiconductor material adjacent the first semiconductor material and having a second doping type opposite the first doping type, defining a P-N junction within the waveguide structure; a first photonic crystal layer on an upper surface of the first semiconductor material; a first plurality of semiconductor pillars having the first doping type, each semiconductor pillar of the first plurality of semiconductor pillars embedded within the first photonic crystal layer, and having a top surface substantially coplanar with a top surface of the first photonic crystal layer; a second photonic crystal layer on an upper surface of the second semiconductor material; and a second plurality of semiconductor pillars having the second doping type, each semiconductor pillar of the first plurality of semiconductor pillars embedded within the second photonic crystal layer, and having a top surface substantially coplanar with a top surface of the second photonic crystal layer.

Other aspects of the present disclosure provide an optical ring modulator, including: a waveguide structure, including: a first semiconductor material having a first doping type, and a second semiconductor material adjacent the first semiconductor material and having a second doping type opposite the first doping type, defining a P-N junction within the waveguide structure; a first plurality of photonic crystal pillars within the first semiconductor material, each photonic crystal pillar of the first plurality of photonic crystal pillars having a bottom surface that is substantially coplanar with a bottom surface of the first semiconductor material; a first photonic crystal layer on the first plurality of photonic crystal pillars and within a recessed region of the first semiconductor material; a second plurality of photonic crystal pillars within the second semiconductor material, each photonic crystal pillar of the second plurality of photonic crystal pillars having a bottom surface that is substantially coplanar with a bottom surface of the second semiconductor material; and a second photonic crystal layer on the second plurality of photonic crystal pillars and within a recessed region of the second semiconductor material.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure relates to an optical ring modulator for processing of optical signals. Embodiments of the disclosure may be implemented on photonic integrated circuit (PIC) dies. PIC dies may include semiconductor wafers structured to include electrical components (e.g., wires, vias, transistors, and other devices) as well as photonic elements (e.g., an optical waveguide, photodiode, thermal phase shift elements, ring filters, etc.) for transmitting and/or processing photonic signals. PIC dies may include signal modulation hardware, e.g., Mach-Zehnder Modulators (MZMs) for filtering optical signals to determine the phase shift between them. Such components may process optical signals to be multiplexed, demultiplexed, and/or otherwise prepared for transmission to other portions of the PIC die for processing.

Embodiments of the disclosure may include, e.g., an optical ring modulator formed of semiconductor material in addition to photonic crystals arranged in layers or pillars within the semiconductor material. The semiconductor material may include two oppositely doped semiconductor materials, thus defining a P-N junction at the physical interface between the two semiconductor materials. The P-N junction forms a diode when an electrical voltage is applied across the two semiconductor materials, e.g., through conductive contacts thereto. The semiconductor material of the optical ring modulator, which may be arranged in the shape of a ring, receives light from a waveguide during operation of a PIC die. The light will pass through the semiconductor material and change carrier concentration across the P-N junction, thus changing the effective index and the optical length of the ring.

Embodiments of the disclosure overcome certain technical limitations of semiconductor-based optical ring modulators by increasing the interaction between photonic signals and the P-N junction while it passes through the ring structure. In the example of a ring modulator (e.g., having a radius of approximately ten micrometers (μm)), photonic signals must travel the entire length of the ring at least one time. Embodiments of the disclosure increase the mode interaction between photonic signals and the P-N junction by embedding photonic crystals structured to slow down the light within the optical ring modulator. More specifically, embodiments of the disclosure include a plurality of photonic crystal structures, e.g., pillars, or other articles, embedded within the two oppositely doped semiconductor materials.

A photonic crystal material may include any crystalline material having an optical nanostructure that affects the motion of photons therethrough, e.g., by reflecting incident light. Crystalline silicon dioxide ($SiO_2$) is one type of photonic crystal suitable for use in embodiments of the disclosure, but other crystalline materials (e.g., various types of silicon nanocrystals) may be used in further implementations. Each photonic crystal structure in the optical ring modulator may have an upper surface that is substantially coplanar with an upper surface of a respective region of semiconductor material. The upper surface may be a top surface of the material(s), or simply may be an upper surface of the semiconductor material that is horizontally between portions of the material that are coupled to an electrical contact or the P-N junction. The photonic crystal material, however formed and distributed, may direct optical mode toward the P-N junction where it would otherwise travel farther away from the junction within the optical ring modulator before being directed back.

Figure 1:
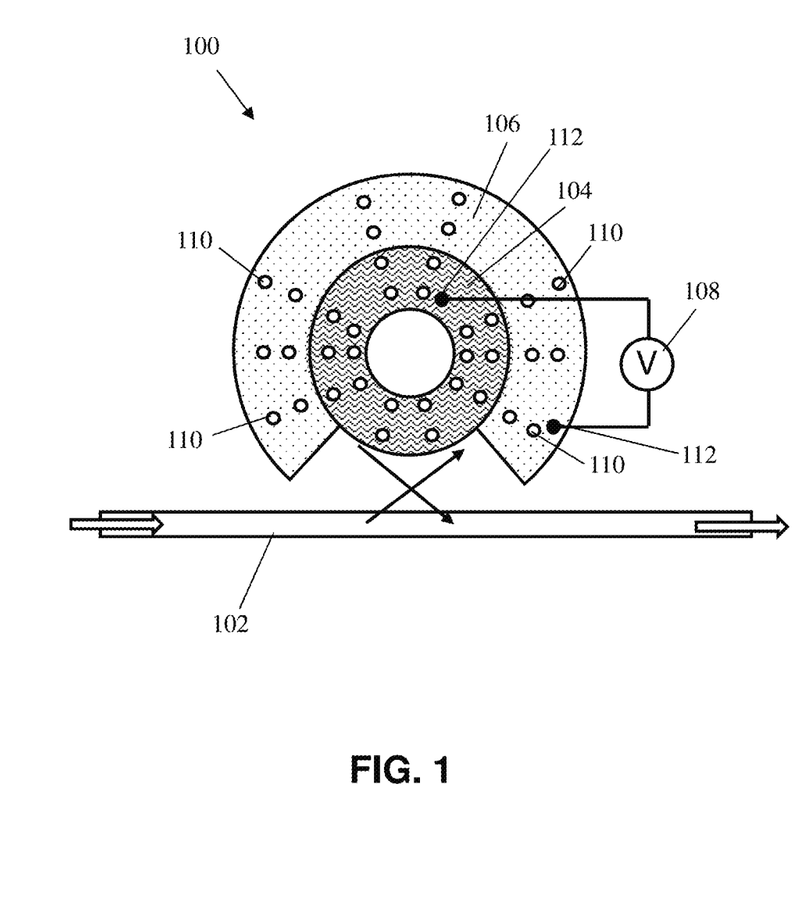
FIG. 1 shows a plan view of a waveguide and an optical ring modulator with photonic crystal material according to embodiments of the disclosure.

FIG. 1 depicts a plan view of an optical ring modulator 100 according to various embodiments of the disclosure. Optical ring modulator 100 may function as an optical filter, e.g., for tuning of an optical signal as it passes from one area of a PIC die to another to ensure that encoded data is transmitted accurately and without significant noise, signal loss, etc. Waveguide 102 may include any currently known or later developed light-transmitting medium, including various silicon-based and/or nitride-based optical transmission materials. According to one example, waveguide 102 may include silicon nitride (Si3N4), or other materials having the same or similar properties. Waveguide 102 may be optically aligned with optical ring modulator 100, in order to regulate how much light is coupled to optical ring modulator 100. In the FIG. 1 example, waveguide 102 receives light from, and outputs light to, one waveguide 102. It is understood that further implementations may include multiple waveguides 102, each configured for sending of optical signals to, and receiving of optical signals from, optical ring modulator 100.

Optical ring modulator 100 may shift the phase of optical signals. An optical ring modulator is a set of interconnected waveguides, one of which takes the form of a closed loop between a waveguide for carrying an input optical signal and a waveguide for transmitting an output optical signal. The band of desired wavelengths for optical ring modulator 100 may be known as "resonance wavelengths," while rejected wavelengths may be considered "non-resonant wavelengths." During operation, light of the resonant wavelength(s) is passed through the loop from waveguide 102, and increases in its intensity over multiple round-trips through the closed loop ("ring"). The transmitted optical signals may undergo constructive interference as they pass through the closed loop, before being output to an output "bus" waveguide, which may be the same as or different from waveguide 102, and which serves as a detector waveguide. It is understood that optical ring modulator 100 optionally may include light-filtering elements that are not ring shaped, but otherwise perform substantially the same function of filtering of selected wavelengths before they are output from optical ring modulator 100 to a bus waveguide such as waveguide 102.

To implement the optical filtering functions described herein, optical ring modulator 100 includes electrically active semiconductor materials that are arranged to form a P-N diode junction under application of an electric voltage. For example, optical ring modulator 100 may include a first semiconductor material 104 having a first doping type, and a second semiconductor material 106 having a second doping type that is opposite the first doping type. First semiconductor material 104 may define an inner ring of optical ring modulator 100 and second semiconductor material 106 may define an outer ring of optical ring modulator 100, or vice versa. Semiconductor material(s) 104, 106 may include but are not limited to silicon, germanium, silicon germanium, silicon carbide, and those consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Other suitable substrates include II-VI compound semiconductors having a composition $Zn_{A1}Cd_{A2}Se_{B1}Te_{B2}$, where A1, A2, B1, and B2 are relative proportions each greater than or equal to zero and A1+A2+B1+B2=1 (1 being a total mole quantity). Furthermore, a portion entirety of material(s) 104, 106 may be strained.

First semiconductor material 104 and second semiconductor material 106 each may include dopants. The dopants within each semiconductor material 104, 106 may be of opposite polarity with respect to the other, such that a physical interface between materials 104, 106 defines a P-N junction. According to one example, first semiconductor material 104 may have P-type doping, while second semiconductor material 106 may have N-type doping. When referring to dopants, P-type dopants refer to elements introduced into semiconductor material to generate free holes by "accepting" electrons from a semiconductor atom and consequently "releasing" the hole. The acceptor atom must have one valence electron less than the host semiconductor. P-type dopants suitable for use in semiconductor material(s) 104, 106 may include but are not limited to: boron (B), indium (In) and gallium (Ga). Boron (B) is the most common acceptor in silicon technology. Further alternatives include In and Ga. Ga features high diffusivity in silicon dioxide ($SiO_2$), and hence, the oxide cannot be used as a mask during Ga diffusion. N-type dopants are elements introduced into semiconductor materials to generate free electrons, e.g., by "donating" an electron to semiconductor. N-type dopants must have one more valance electron than the semiconductor. Common N-type donors in silicon (Si) include, e.g., phosphorous (P), arsenic (As), and/or antimony (Sb). The doping of each semiconductor material 104, 106 may be achieved via direct ion implantation, and/or various other techniques known in the art. The processing techniques for doping of various materials optical modulator 100 is known in the art and thus not described in further detail. In addition, although first semiconductor material 104 and second semiconductor material 106 may have a vertically-extending physical interface as a result of contacting each other along respective sidewalls, all or a portion of the physical interface may extend horizontally in further implementations.

To induce an electrically active diode junction between each semiconductor material 104, 106 of optical ring modulator 100, a voltage source 108 may be electrically coupled to optical ring modulator 100. More specifically, a cathode terminal of voltage source 108 may be coupled to first semiconductor material 104 while an anode terminal of voltage source 108 may be coupled to second semiconductor material 106. The coupling of voltage source 108 to semiconductor materials 104, 106 may be achieved with conductive contacts to semiconductor material(s) 104, 106, as described herein.

Optical ring modulator 100 differs from conventional optical filtration devices, ring modulators, etc., by include a plurality of photonic structures 110 distributed throughout first semiconductor material 104 and second semiconductor material 106, as opposed to being confined to a single portion of material(s) 104, 106 and/or being a continuous region of photonic crystal material. Photonic crystal structures 110 may be formed, e.g., by removing targeted portions of semiconductor material 104, 106 (e.g., by way of etching with the aid of a mask), and depositing photonic crystal material(s) within the etched openings to create several distinct photonic crystal structures 110 throughout optical ring modulator 100. Several types of photonic crystal structures 110 may be formed in this manner, e.g., photonic crystal layers, photonic crystal pillars, and/or other types of shapes. The size and shape of photonic crystal structures 110 may be selected based on the wavelength(s) of light to be transmitted through optical ring modulator 100, technical application, and/or other factors. During operation, photonic crystal structures 110 will divert errant light within optical ring modulator 100 toward the P-N junction between semiconductor materials 104, 106 and thus increase the interaction between transmitted light and the P-N junction.

Applicants have determined, as a general proposition, that a higher mass percentage of photonic crystal structures 110 relative to the mass of optical ring modulator 100 will be associated with a higher "group index" (i.e., velocity of light in a vacuum relative to the light velocity mode of light within a medium) for optical ring modulator 100. A higher group index generally indicates a lower velocity of light and hence greater interaction between an optical signal and the P-N junction between semiconductor materials 104, 106. In various embodiments of the disclosure, several examples of which are described herein, photonic crystal structures 110 may be formed within and/or distributed throughout optical ring modulator 100 to provide greater or lesser effects on light propagation within optical ring modulator 100.

Figure 2:
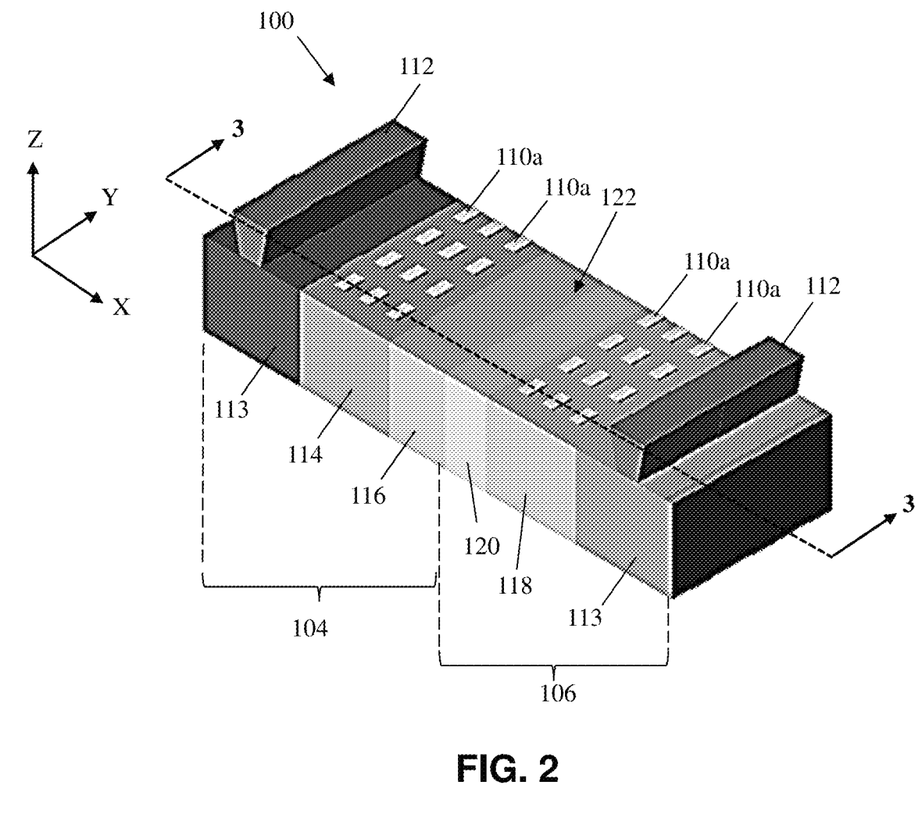
FIG. 2 shows a perspective view of a portion of an optical ring modulator with photonic crystal pillars according to embodiments of the disclosure.
Figure 3:
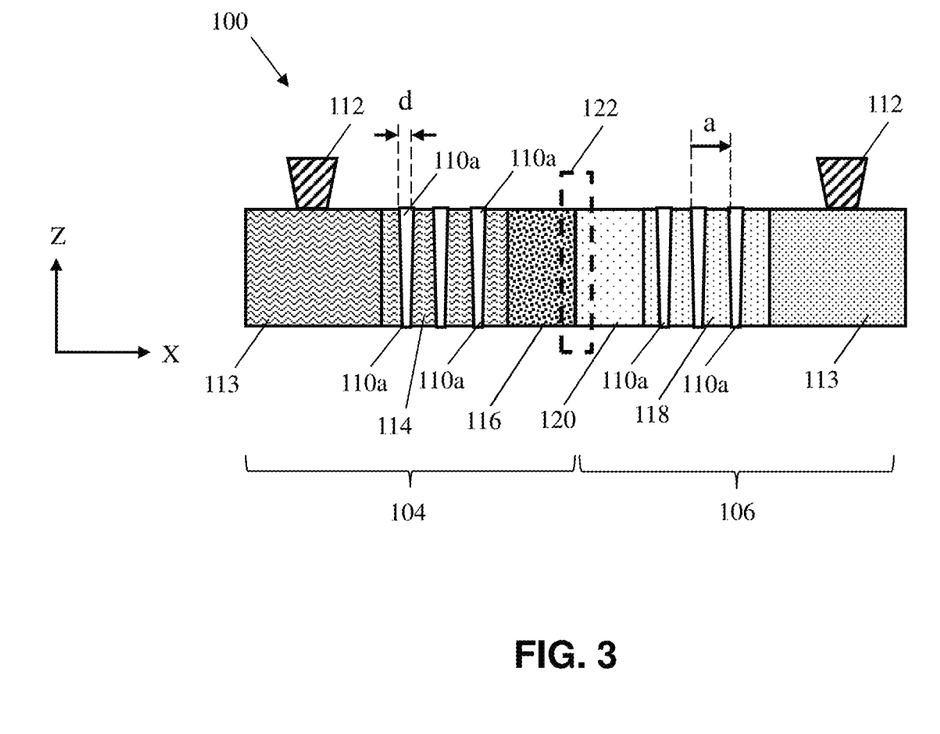
FIG. 3 shows a cross-sectional view of a portion of an optical ring modulator with photonic crystal pillars, along view line 3-3 of FIG. 2, according to embodiments of the disclosure.

Referring now to FIGS. 2 and 3, in which FIG. 2 provides a partial perspective view and FIG. 3 provides a cross-sectional view in plane X-Z along view line 3-3 (FIG. 2), an example configuration of optical ring modulator 100 is discussed. As previously noted, optical ring modulator 100 may include first semiconductor material 104 and second semiconductor material 106 of opposite doping types. A set of conductive contacts 112 may be formed on semiconductor materials 104, 106. Each contact 112 may be formed at respective locations, e.g., a terminal region 113 of first semiconductor material 104 or second semiconductor material 106. Applying a voltage to terminal region 113 of semiconductor materials 104, 106 (e.g., from voltage source 108 (FIG. 1)) will electrically drive the operation of optical ring modulator 100. First semiconductor material 106 may include a first intermediate region 114, having a higher dopant concentration than terminal region 113 of first semiconductor material 104 beneath contact 112. First semiconductor material 104 also may include a first depletion region 116 having a higher dopant concentration than the remainder of first semiconductor material 104, including first intermediate region 114. In a similar configuration, second semiconductor material 106 may include a second intermediate region 118, having a higher dopant concentration than its adjacent terminal region 113 beneath contact 112. Second semiconductor material 106 thus also may include a second depletion region 120 having a higher dopant concentration than the remainder of second semiconductor material 106, including second intermediate region 118. The physical interface between highly doped material each depletion region 116, 120 may form a P-N junction 122 within optical ring modulator 100, to change the effective refractive index of the waveguide therein.

To increase the interaction between optical signals within optical ring modulator 100, and P-N junction 122, photonic crystal structures 110 (FIG. 1) in the form of photonic crystal pillars 110a may be distributed throughout each semiconductor material 104, 106 of optical ring modulator 100. According to one example, several photonic crystal pillars 110a may be formed within each intermediate region 114, 118 of each semiconductor material 104, 106. Photonic crystal pillars 110a may have upper surfaces that are substantially coplanar with adjacent upper surfaces of intermediate region(s) 114, 118. In the example of FIGS. 2, 3, the upper surfaces of photonic crystal pillars 110a and intermediate regions 114, 118 may be substantially coplanar with the top surface(s) of semiconductor materials 104, 106, although this is not necessarily required in all implementations. Each photonic crystal pillar 110a may have a vertical thickness that is substantially the same as the intermediate region(s) 114, 118 in which they are located. However, this is not necessarily required in all instances. The presence of photonic crystal pillars 110a may cause light within optical ring modulator 100 to be diverted toward P-N junction 122 for increased optical interaction with the induced electrical diode within depletion regions 116, 120.

The distribution of photonic crystal pillars 110a may be controlled to further increase the optical interaction between signals within optical ring modulator 100, and P-N junction 122. The distribution of photonic crystal pillars 110a may be defined based on, e.g., a pitch-to-diameter ratio and/or other physical attributes of photonic crystal pillar(s) 110a relative to first and/or second semiconductor materials 104, 106. The diameter, indicated by reference sign "d," (FIG. 3 only) indicates the total horizontal width of one photonic crystal pillar 110a along the X-axis at an upper surface thereof. The physical parameter "pitch," indicated by reference sign "a" (FIG. 3 only), refers to the sum of the diameter of one photonic crystal pillar 110a and the horizontal width of its adjacent portion of semiconductor material 104, 106 between two photonic crystal pillars 110a. According to one example, the diameter d of each photonic crystal pillar 110a may be approximately two-hundred nanometers (nm), while the pitch a may be approximately four-hundred nm. In this case, the pitch-to-diameter ratio between each pair of photonic crystal pillars 110a in optical ring modulator 100 may be approximately two-to-one. These physical parameters of photonic crystal pillar(s) 110a may be suitable for selected wavelengths, e.g., light having a wavelength of about 1560 nm, due to being effective to divert multiple wavelength classifications. Such wavelength classifications may include e.g., both original band (1260-1360 nm wavelengths), and conventional band (1530 nm-1565 nm wavelengths) in various applications.

Figure 4:
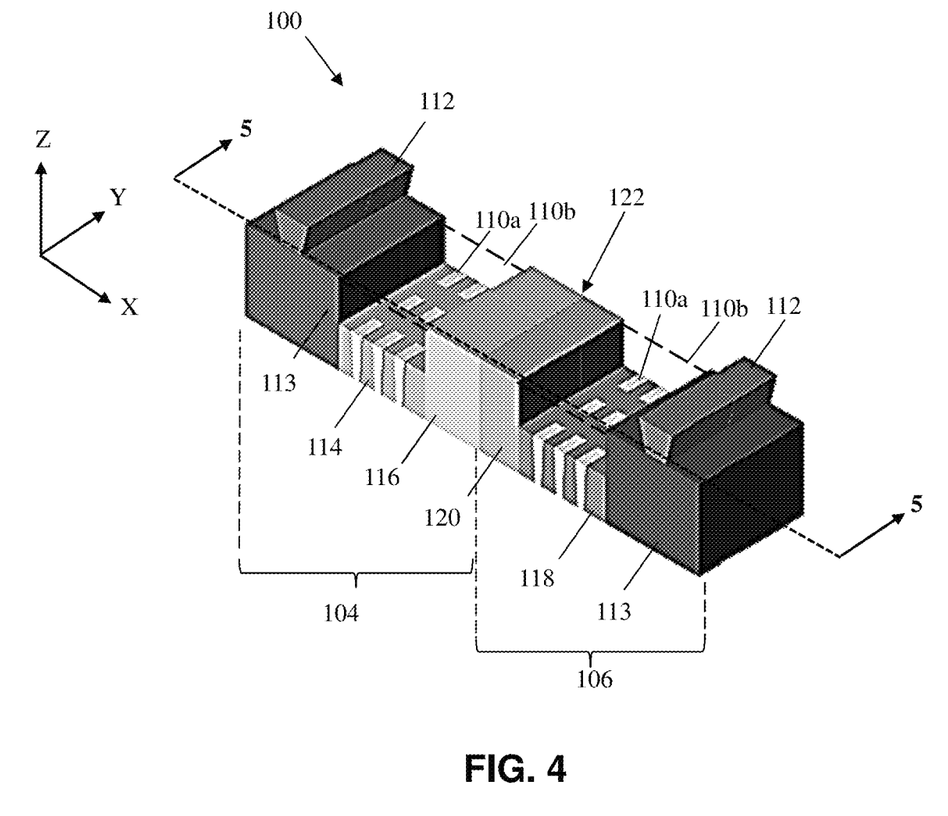
FIG. 4 shows a perspective view of a portion of an optical ring modulator with photonic crystal pillars and photonic crystal layers according to embodiments of the disclosure.
Figure 5:
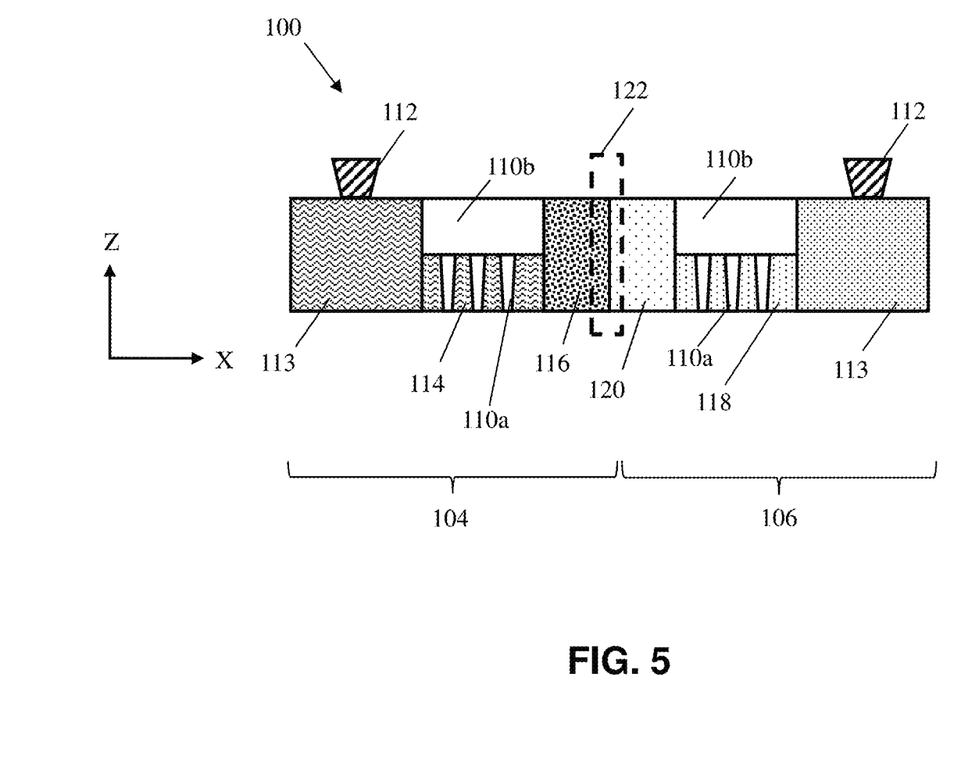
FIG. 5 shows a cross-sectional view of a portion of an optical ring modulator with photonic crystal pillars and photonic crystal layers, along view line 5-5 of FIG. 4, according to embodiments of the disclosure.

In further implementations, one illustrated by example in FIGS. 4 and 5, optical ring modulator 100 may be provide photonic crystal pillars 110a together with other types of photonic crystal structures. FIG. 4 provides a partial perspective view, and FIG. 5 provides a cross-sectional view in plane X-Z along view lines 5-5 of FIG. 4. An upper surface of intermediate regions 114, 118 may be vertically recessed with respect to the adjacent upper surfaces of depletion region(s) 116, 120 and remaining portions of semiconductor material 104, 106. In this configuration, depletion region(s) 116, 120 each may define a raised portion of first semiconductor material 104 and second semiconductor material 106, respectively. P-N junction 122 may defined along the physical interface between depletion regions 116, 120 of semiconductor materials 104, 106. Photonic crystal pillars 110a may be formed within intermediate regions 114, 118, such that the top surfaces of photonic crystal pillars 110a are substantially coplanar with the recessed upper surfaces of intermediate regions 114, 118. Here, each semiconductor material 104, 106 may include a photonic crystal layer 110b that his horizontally between depletion region(s) 116, 120 and the remainder of semiconductor material 104, 106. Photonic crystal layer 110b is indicated with dashed lines in FIG. 4 to better illustrate the position of intermediate regions 114, 118, and photonic crystal pillars 110a thereunder.

Photonic crystal layer(s) 110b may have the same composition as photonic crystal pillars 110a, or may be formed of a distinct photonic crystal material. During manufacture, photonic crystal layer 110b may be formed by recessing targeted portions of semiconductor materials 104, 106, depositing a layer of crystalline material (e.g., silicon dioxide as discussed elsewhere herein), and planarizing the deposited material to the top surfaces of semiconductor materials 104, 106. Despite the presence of both semiconductor crystal pillars 110a and semiconductor crystal layers 110b optical ring modulator 100 may operate in substantially the same manner as other embodiments discussed herein. However, the addition of photonic crystal layers 110b may further increase the group index of optical ring modulator 100 above what is possible in embodiments where only photonic crystal pillars 110a are included.

Figure 6:
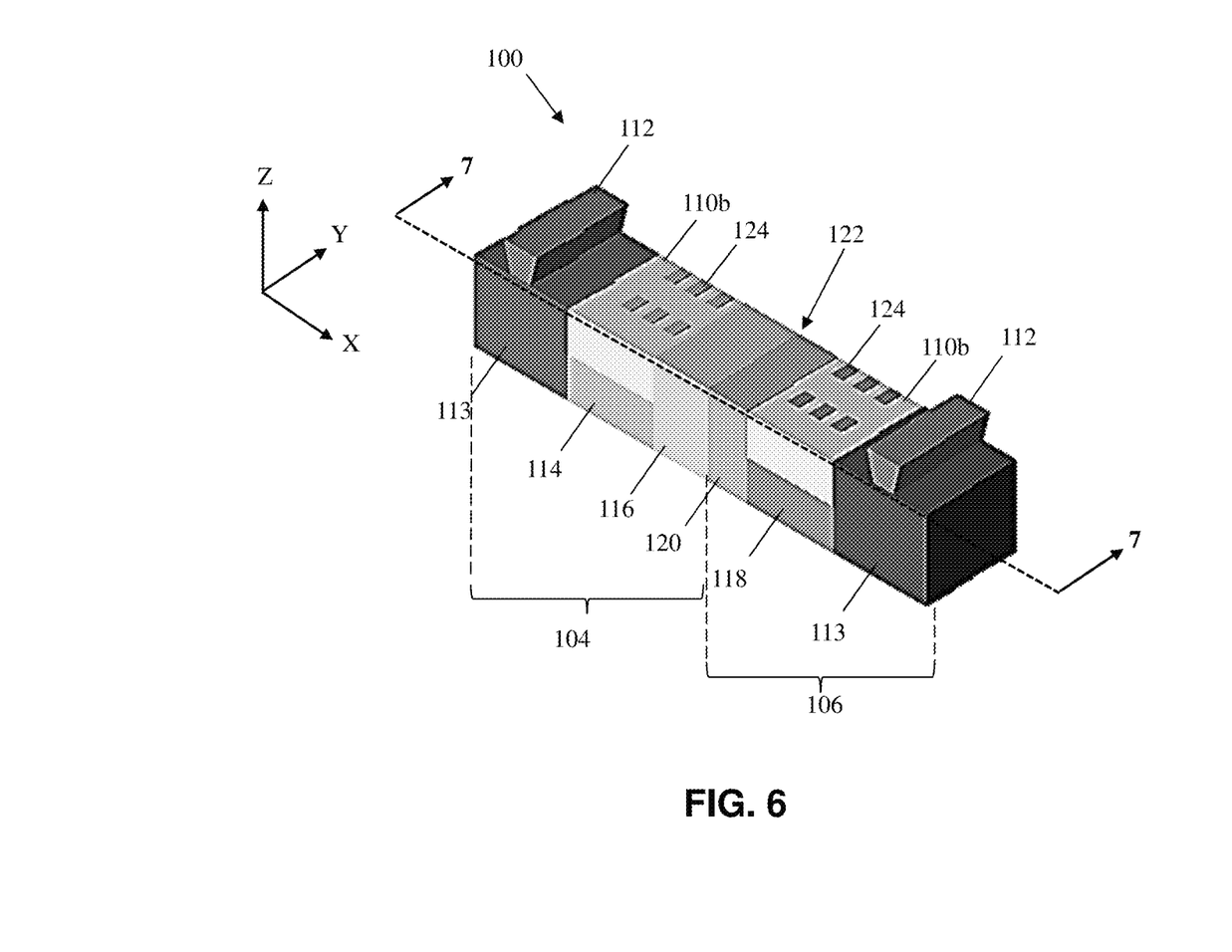
FIG. 6 shows a perspective view of a portion of an optical ring modulator with semiconductor pillars according to embodiments of the disclosure.
Figure 7:
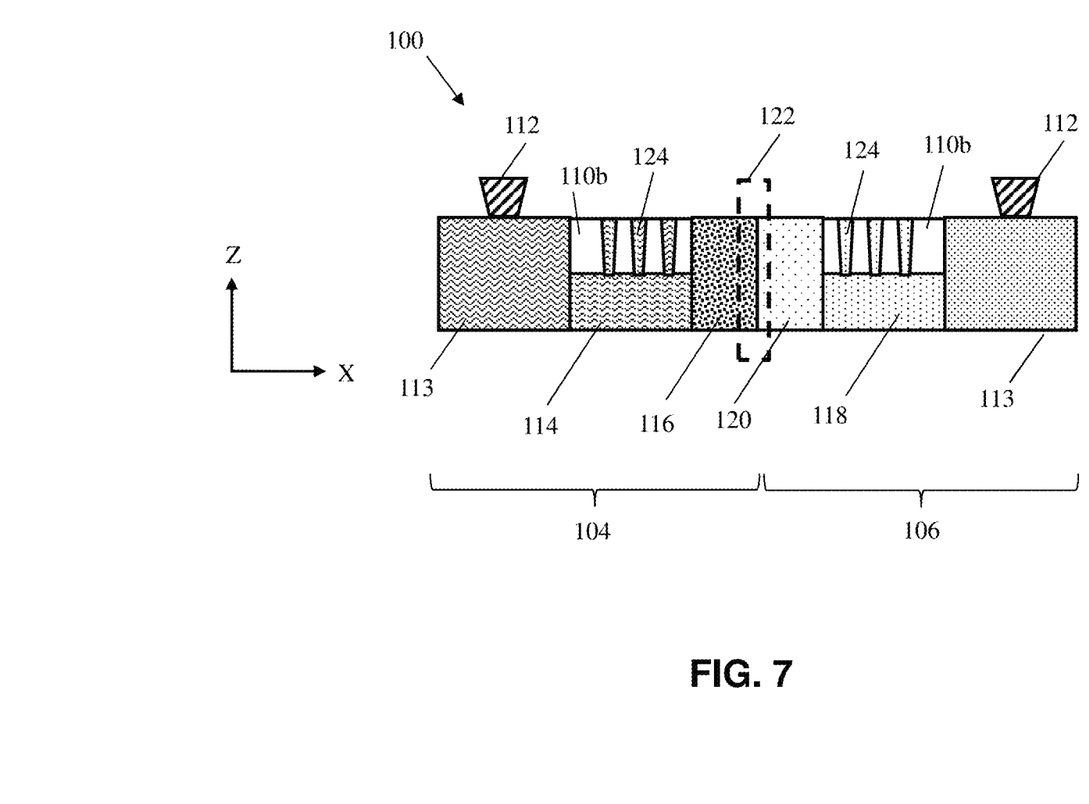
FIG. 7 shows a cross-sectional view of a portion of an optical ring modulator with semiconductor pillars, along view line 7-7 of FIG. 6, according to embodiments of the disclosure.

FIGS. 6 and 7 illustrate optical ring modulator 100 with a distinct configuration of semiconductor materials and photonic crystal materials. Similar to other examples discussed herein, FIG. 6 provides a partial perspective view optical ring modulator 100, while FIG. 7 provides a cross-sectional view in plane X-Z along view line 7-7 of FIG. 6. In such an example, photonic crystal layer 110b may be formed in recessed portions of semiconductor materials 104, 106 in a similar arrangement to that shown and described with respect to FIGS. 4 and 5. Although photonic crystal pillars 110a (FIGS. 2-5) are omitted in FIGS. 6 and 7, they may still be present within optical ring modulator 100 at other locations and/or in the same positions shown in the FIG. 2-5 examples.

According to an example, optical ring modulator 100 may include a plurality of semiconductor pillars 124, each formed within respective portions of photonic crystal layer 110*b* and on respective portions of first semiconductor material 104 and second semiconductor material 106. Semiconductor pillars 124 each may be formed of a doped semiconductor material and may have the same doping type and/or concentration as underlying portions of semiconductor material within intermediate region(s) 114, 118. In an example implementation, semiconductor pillars 124 over first intermediate region 114 may have the first doping type (e.g., P-type doping) while semiconductor pillars 124 over second intermediate region 118 may have the second, opposite doping type (e.g., N-type doping).

Semiconductor pillars 124 may be formed within photonic crystal layer 110*b*, e.g., by removing selected portions of photonic crystal layer 110*b* and forming doped semiconductor material within the openings, e.g., via deposition and/or epitaxial growth. Semiconductor pillars 124 additionally or alternatively may be formed by removing other portions of semiconductor material, and replacing the removed portions with photonic crystal layer 110*b*, such that the remaining semiconductor material forms semiconductor pillars 124. However semiconductor pillars 124 are formed, they may have a vertical thickness that is substantially equal to the adjacent portions of photonic crystal layer 110*b*. Thus, semiconductor pillars 124 each may have an upper surface that is substantially coplanar with the upper surface of photonic crystal layer 110*b*, as well as top surfaces of semiconductor materials 104, 106 and depletion regions 116, 118.

Figure 8:
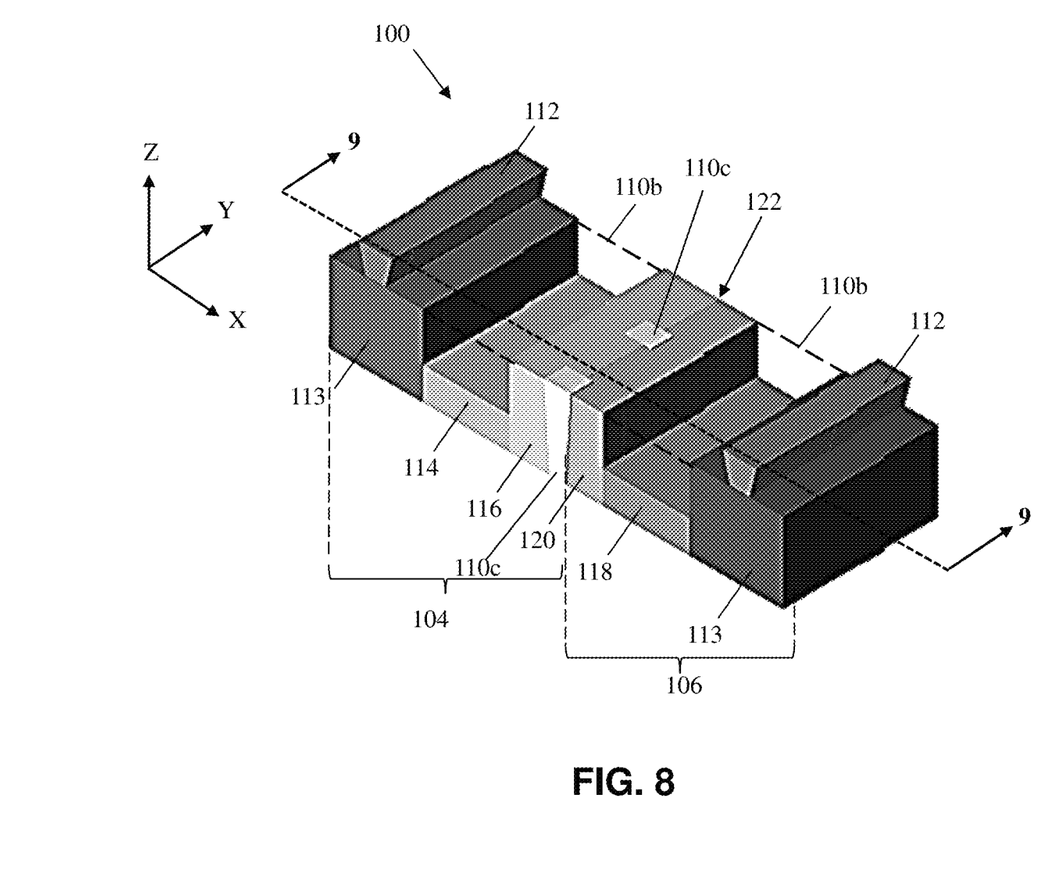
FIG. 8 shows a perspective view of a portion of an optical ring modulator with photonic crystal layers, and photonic crystal pillars between portions of a P-N junction according to embodiments of the disclosure.
Figure 9:
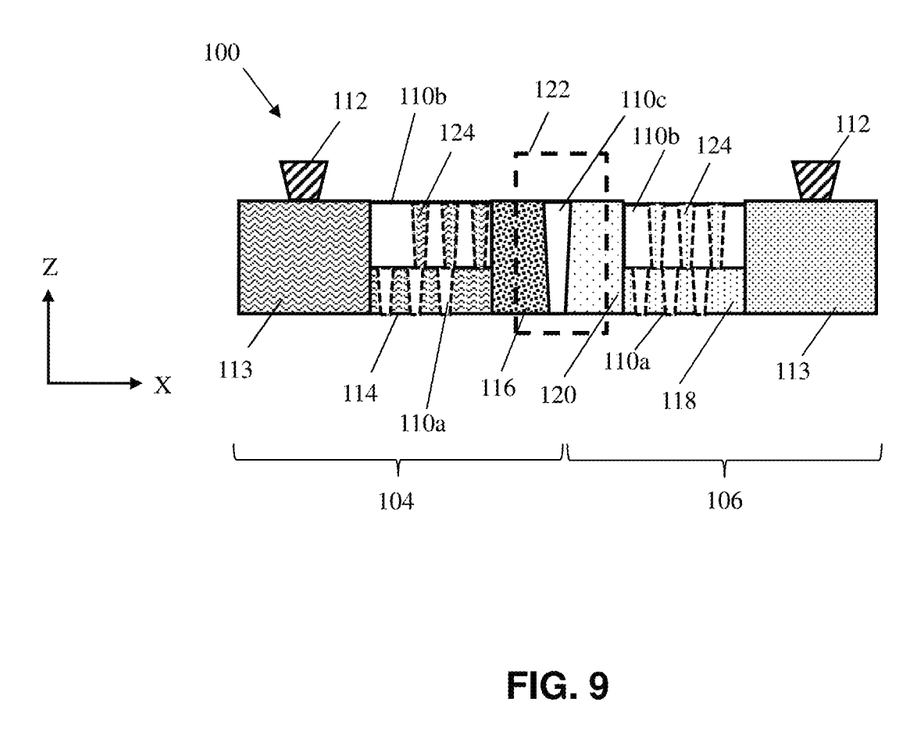
FIG. 9 shows a cross-sectional view of a portion of an optical ring modulator with photonic crystal layers, and photonic crystal pillars between portions of a P-N junction, along view line 9-9 of FIG. 8, according to embodiments of the disclosure.

FIGS. 8 and 9 depict features of optical ring modulator 100 in further implementations. FIG. 8 provides a partial perspective view of optical ring modulator 100, while FIG. 9 provides a cross-sectional view in plane X-Z along view line 9-9 of FIG. 8. Optical ring modulator 100, in this case, each of first semiconductor material 104 and second semiconductor material 106 may have at least one photonic crystal layer 110*b* therein. Additionally, photonic crystal pillars 110*a* (FIG. 9 only) and/or semiconductor pillars 124 (FIG. 9 only) may or may not be located within semiconductor material(s) 104, 106. Possible locations of such pillars are depicted with dashed lines in FIG. 9. Photonic crystal pillars 110*a*, when included, may be located within intermediate region(s) 114, 118. Semiconductor pillars 124, when included, may be located within photonic crystal layer 110*b*.

Regardless of whether photonic crystal pillar(s) 110*a* or semiconductor pillar(s) 124 are included, optical ring modulator 100 may include a group of interposed photonic crystal pillars 110*c* (two shown in FIG. 8). Interposed photonic crystal pillars 110*c* may be located directly between oppositely doped portions of first semiconductor material 104 and second semiconductor material 106. In some implementations, interposed photonic crystal pillars may be directly between first depletion region 116 and second depletion region 120, and thus may be horizontally adjacent to P-N junction(s) 122 (FIG. 8) along the Y-axis. By including interposed photonic crystal pillars 110*c* within optical ring modulator 100 to create staggered P-N junctions 122, the group index of optical ring modulator 100 may further increase the interaction between photonic signals and each of the P-N junctions 122.

Figure 10:
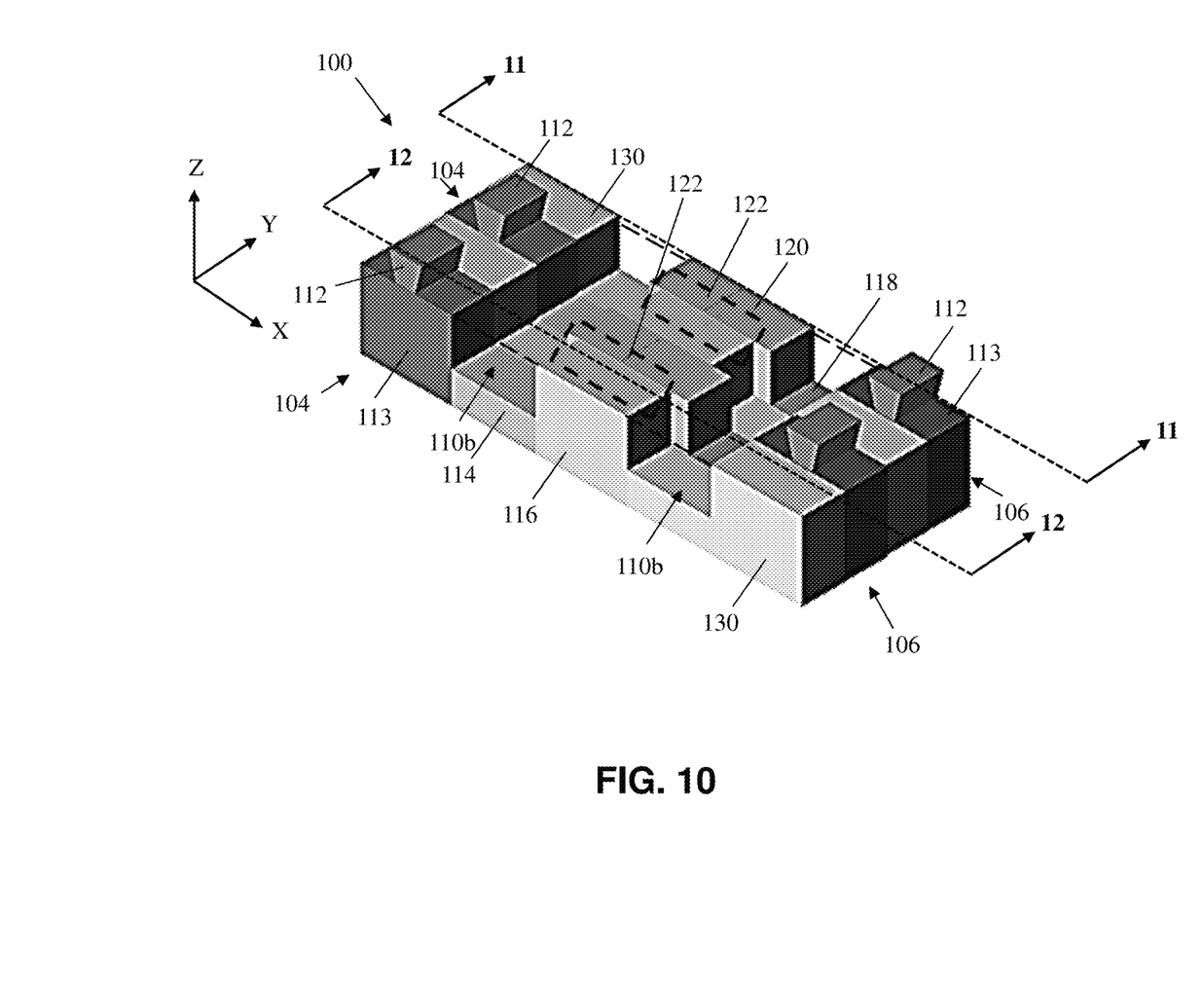
FIG. 10 shows a perspective view of a portion of an optical ring modulator with interdigitated semiconductor materials according to embodiments of the disclosure.
Figure 11:
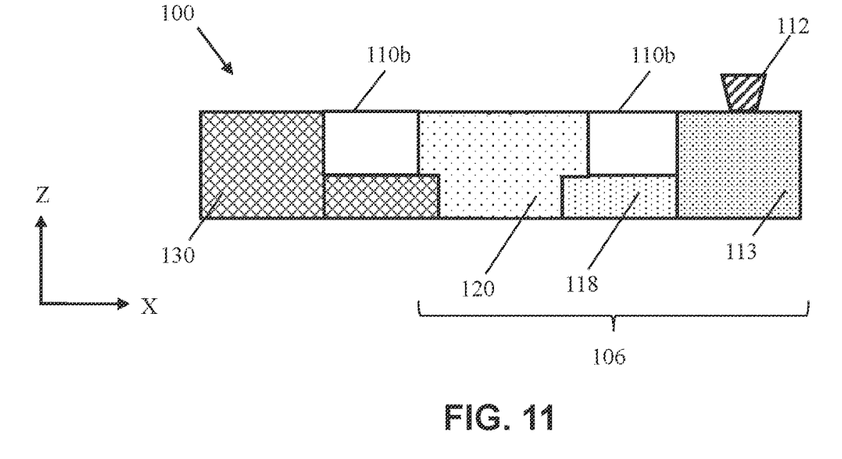
FIG. 11 shows a first cross-sectional view of a portion of an optical ring modulator with interdigitated semiconductor materials, along view line 11-11 of FIG. 10, according to embodiments of the disclosure.
Figure 12:
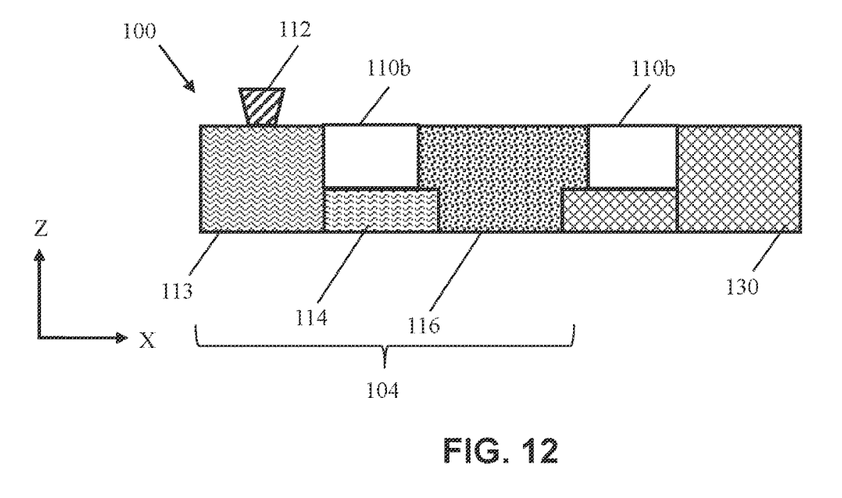
FIG. 12 shows a second cross-sectional view of a portion of an optical ring modulator with interdigitated semiconductor materials, along view line 12-12 of FIG. 10, according to embodiments of the disclosure.

FIGS. 10-12 depict further implementations of optical ring modulator 100, in which portions of oppositely-doped materials are circumferentially adjacent to each other (i.e., in the Y-axis direction), rather than being radially adjacent to each other (i.e., in the X-axis direction). FIG. 10 depicts a partial perspective view of such a configuration, FIG. 11 provides a first cross-sectional view in the X-Z plane along view line 11-11 in FIG. 10, and FIG. 12 provides a second cross-sectional view in the X-Z plane alone view line 12-12 in FIG. 10. In such a configuration, each X-Z cross-section of optical ring modulator 100 may include doped semiconductor material of only one doping type, e.g., either first semiconductor material 104 (FIGS. 10, 11) or second semiconductor material 106 (FIGS. 10, 12).

In the example of FIGS. 10-12, first semiconductor material 104 interdigitates with second semiconductor material 106 along the radial direction (i.e., the X-axis direction in FIGS. 10-12), such that P-N junctions 122 are formed at the physical interface between the interdigitated semiconductor materials. Photonic crystal layer(s) 110*b* may be present alongside first semiconductor material 104, and second semiconductor material 106, to assist photonic signals in optical ring modulator 100 in traveling toward P-N junctions 122 in substantially the same manner as other examples discussed herein. In each X-Z cross-section of optical ring modulator 100, first semiconductor material 104 or second semiconductor material 106 may be adjacent an inactive region 130, composed of non-doped semiconductor material, insulative material, and/or other structures to prevent current from bypassing P-N junctions 122 (FIG. 10). The interdigitating of first semiconductor material 104 with second semiconductor material 106 may continue across the circumference of optical ring modulator 100 when it is in a ring shape. Although the various features of optical ring modulator 100 may be described herein as additional or alternative embodiments, it is understood that any of the variously described features (e.g., photonic crystal pillars 110*a*, photonic crystal layers 110*b*, interposed photonic crystal pillars 110*c*, semiconductor pillars 124, etc.) may be adapted from some examples for use in others, in any conceivable combination.

Embodiments of the disclosure may provide various technical and commercial advantages, some of which are described by example herein. Various embodiments of the disclosure provide photonic crystal structures (e.g., pillars and/or layers in close proximity to a P-N junction) in an optical ring modulator. Such photonic crystal structures are effective to increase the optical interaction between photonic signals and electrically active P-N junctions for optical filtration, e.g., by increasing the group index of the optical modulator structure. Various embodiments of the disclosure may be implemented in ring-shaped modulators, to increase the modulation efficiency of the structure throughout an entire length of the ring. During operation, these effects may provide a total insertion loss (i.e., insertion loss measured on a power-time curve of a digital signal) that can be less than approximately one decibel (dB), as compared with an insertion loss of at least approximately 4.5 dB in a typically operating optical modulators that lack photonic crystal structures therein. Conversely, the inclusion of photonic crystal structures in a modulator may substantially increase the extinction ratio (i.e., the ratio between two levels of optical power for a digital signal in the modulator) to over approximately twenty dB, as compared to the substantially smaller extinction ratios achieved in conventional ring modulators (e.g., approximately 4.5 dB).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An optical ring modulator, comprising:
    a waveguide structure, including:
        a first semiconductor material having a first doping type, and including:
            a first terminal region having a first vertical thickness,
            a first depletion region having the first vertical thickness, and
            a first vertically recessed region in between the first terminal region and the first depletion region, the first vertically recessed region having a second vertical thickness less than the first vertical thickness, and
        a second semiconductor material adjacent the first semiconductor material and having a second doping type opposite the first doping type, defining a P-N junction within the waveguide structure, and including
            a second terminal region having the first vertical thickness,
            a second depletion region having the first vertical thickness, and
            a second vertically recessed region in between the second terminal region and the second depletion region, the second vertically recessed region having the second vertical thickness; and
    a plurality of photonic crystal pillars within an interface of the P-N junction.

2. The optical ring modulator of claim 1, wherein the first semiconductor material is horizontally adjacent to the second semiconductor material.

3. The optical ring modulator of claim 2, wherein the first semiconductor material is adjacent a first insulator along a length of the first semiconductor material, and the second semiconductor material is adjacent a second insulator along a length of the second semiconductor material, such that the first semiconductor material is interdigitated with the second semiconductor material throughout a circumference of the optical ring modulator, wherein a portion of the length of the first semiconductor material is not adjacent the second semiconductor material and a portion of the length of the second semiconductor material is not adjacent the first semiconductor material.

4. The optical ring modulator of claim 1, further comprising:
    a first plurality of semiconductor pillars having the first doping type, each semiconductor pillar of the first plurality of semiconductor pillars being within a first photonic crystal layer, the first photonic crystal layer above the first vertically recessed region wherein each semiconductor pillar in the first plurality of semiconductor pillars has a top surface substantially coplanar with a top surface of the first semiconductor material; and
    a second plurality of semiconductor pillars having the second doping type, each semiconductor pillar of the second plurality of semiconductor pillars being within a second photonic crystal layer, the second photonic crystal layer above the second vertically recessed region, and wherein each semiconductor pillar in the second plurality of semiconductor pillars has a top surface substantially coplanar with a top surface of the second semiconductor material.

5. The optical ring modulator of claim 1, wherein the first semiconductor material and the second semiconductor material include silicon (Si), and the plurality of photonic crystal pillars includes crystalline silicon dioxide ($SiO_2$).

6. The optical ring modulator of claim 1, wherein each photonic crystal pillar in the plurality of photonic crystal pillars has an uppermost surface and a bottommost surface, wherein the uppermost surface has a horizontal width that is smaller than a horizontal width of the bottommost surface.

7. An optical ring modulator, comprising:
    a waveguide structure, including:
        a first semiconductor material having a first doping type, and including a first vertically recessed region horizontally between a first pair of non-recessed regions, and
        a second semiconductor material adjacent the first semiconductor material, including a second vertically recessed region horizontally between a second pair of non-recessed regions, the second semiconductor material having a second doping type opposite the first doping type, defining a P-N junction within the waveguide structure,
    a first photonic crystal pillar adjacent a second photonic crystal pillar within an interface of the P-N junction, such that the first photonic crystal pillar and second photonic crystal pillar disrupt a depletion region around the interface of the P-N junction;
a first plurality of photonic crystal pillars within the first vertically recessed region of the first semiconductor material, each photonic crystal pillar of the first plurality of photonic crystal pillars includes a bottom surface that is substantially coplanar with a bottom surface of the first semiconductor material and a top surface that is substantially coplanar with a top surface of the pair of first non-recessed regions;
a first photonic crystal layer on the first plurality of photonic crystal pillars and above the first vertically recessed region of the first semiconductor material;
a second plurality of photonic crystal pillars within the second vertically recessed region of the second semiconductor material, each photonic crystal pillar of the second plurality of photonic crystal pillars includes a bottom surface that is substantially coplanar with a bottom surface of the second semiconductor material and a top surface that is substantially coplanar with a top surface of the pair of second non-recessed regions; and
a second photonic crystal layer on the second plurality of photonic crystal pillars and above the second vertically recessed region of the second semiconductor material.

8. The optical ring modulator of claim 7, wherein:
the first pair of non-recessed regions of the first semiconductor material and the second pair of non-recessed regions of the second semiconductor material include a raised portion having a top surface substantially coplanar with a top surface of the waveguide structure.

9. The optical ring modulator of claim 7, wherein the first semiconductor material and the second semiconductor material include silicon (Si), and the first plurality of photonic crystal pillars or the second plurality of photonic crystal pillars includes crystalline silicon dioxide ($SiO_2$).

10. An optical ring modulator, comprising:
a waveguide structure, including:
a first semiconductor material having a first doping type;
a second semiconductor material horizontally adjacent a second portion of the first semiconductor material, and having a second doping type opposite the first doping type, thereby defining a P-N junction within the waveguide structure;
a first photonic crystal pillar within an interface of the P-N junction and adjacent a second photonic crystal pillar within an interface of the P-N junction; and
a plurality of photonic crystal structures, each photonic crystal structure within the first semiconductor material and the second semiconductor material of the waveguide structure.

11. The optical ring modulator of claim 10, further comprising:
a first plurality of semiconductor pillars having the first doping type, each semiconductor pillar of the first plurality of semiconductor pillars within the first semiconductor material over a first photonic crystal structure of the plurality of photonic crystal structures, and having a top surface substantially coplanar with a top surface of the first semiconductor material; and
a second plurality of semiconductor pillars having the second doping type, each semiconductor pillar of the second plurality of semiconductor pillars within the second semiconductor material over a second photonic crystal structure of the plurality of photonic crystal structures, and having a top surface substantially coplanar with a top surface of the second semiconductor material.

* * * * *